(No Model.)

J. J. CAMPBELL.
FLOOD FENCE.

No. 492,136. Patented Feb. 21, 1893.

Witnesses
Harry L. Amer
H. F. Riley

Inventor
J. J. Campbell.
By his Attorneys,
C A Snow & Co.

UNITED STATES PATENT OFFICE.

JOHN JAMES CAMPBELL, OF GLEESON STATION, TENNESSEE.

FLOOD-FENCE.

SPECIFICATION forming part of Letters Patent No. 492,136, dated February 21, 1893.

Application filed August 10, 1892. Serial No. 442,682. (No model.)

*To all whom it may concern:*

Be it known that I, JOHN JAMES CAMPBELL, a citizen of the United States, residing at Gleeson Station, in the county of Weakley and State of Tennessee, have invented a new and useful Flood-Fence, of which the following is a specification.

The invention relates to improvements in flood gates.

The object of the present invention is to improve the construction of flood-gates, to provide one which will permit drift-wood readily to pass through it, and to provide a cattle-guard to prevent cattle from passing through the gate.

The invention consists in the construction and novel combination and arrangement of parts hereinafter fully described, illustrated in the accompanying drawings and pointed out in the claim hereto appended.

Figure 1:
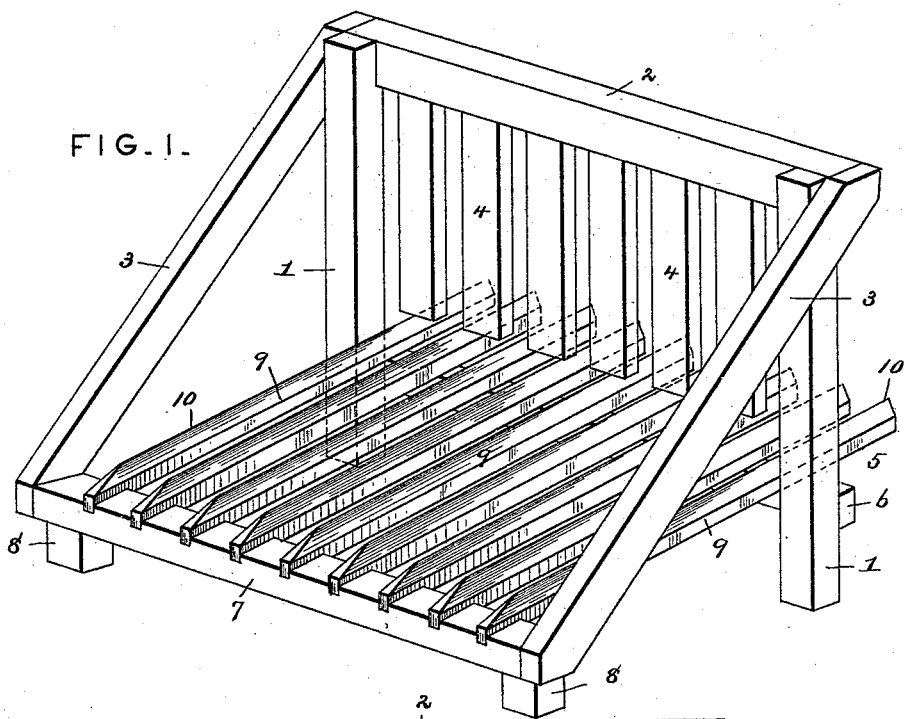
Figure 2:
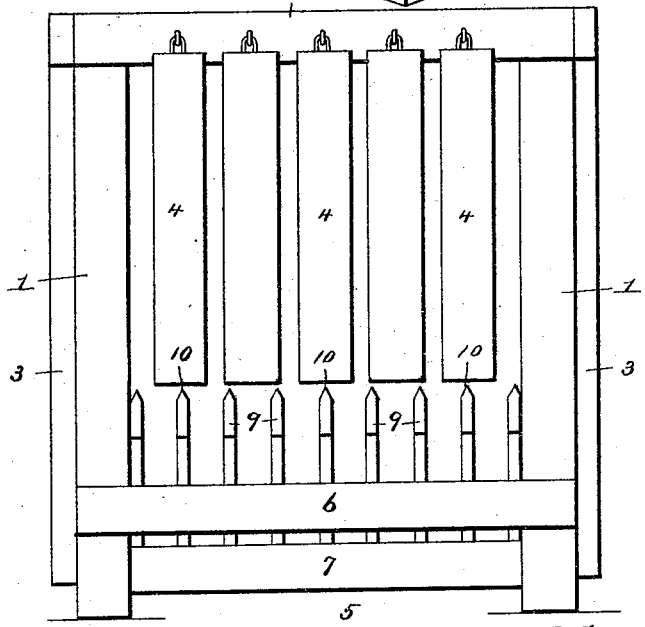

In the drawings—Figure 1 is a perspective view of a flood gate constructed in accordance with this invention. Fig. 2 is a rear elevation of the same.

Like numerals of reference indicate corresponding parts in both the figures of the drawings.

1, 1 designate posts of a supporting frame designed to form a continuation of a fence and to be arranged on opposite sides of a stream, and having their upper ends connected by a top cross-bar 2 and supported by inclined braces 3. Gate bars 4 are suspended from the top cross-bar 2, and are independently hinged thereto, and are adapted to be readily raised by drift-wood and the like to allow such to pass through.

In order to prevent cattle from passing through the gate, a cattle guard 5 is arranged beneath the gate and extends beyond the same, and is supported by horizontal cross-bars 6 and 7 arranged at different elevations to form an inclined floor and secured to the post 1 near the lower ends of the same, and to the lower ends of the inclined braces. The cross-bar 7, and the lower ends of the braces 3 are supported by short posts 8. The inclined cattle guard consists of a series of longitudinally disposed bars 9 arranged at intervals and secured edgewise on the horizontal cross-bars, and having their upper edges 10 beveled, and their lower front ends beveled to form a greater incline. The cattle-guard bars 9 form a bottom to the frame and prevent cattle walking on them and passing through the gate. The general inclination downward of the cattle guard from rear to front prevents the accumulation of drift-wood, and enables the same to pass readily over the cattle-guard.

What I claim is—

The combination of a supporting frame comprising opposite posts 1, the cross-bar 2 connecting the upper ends of the posts, the opposite short posts 8, the horizontal supporting bars 6 and 7 secured to the posts 1 and 8 and disposed transversely of the frame, and the inclined braces 3 extending from the short post to the tops of the posts 1 and arranged at the ends of the supporting bar 7, the series of depending independently hinged gate-bars suspended from the cross-bar 2 and the series of inclined longitudinally disposed bars 9 mounted on the supporting bars 6 and 7 and having their front ends beveled, substantially as described.

In testimony that I claim the foregoing as my own I have hereto affixed my signature in the presence of two witnesses.

JOHN JAMES CAMPBELL.

Witnesses:
ROBT. W. BANDY,
HOWARD W. BANDY.